M. H. BENNETT.
ELECTRIC FURNACE.
APPLICATION FILED OCT. 1, 1919.

1,404,734.

Patented Jan. 31, 1922.

To Transformer

Inventor:
Morris H. Bennett
by his Attys:

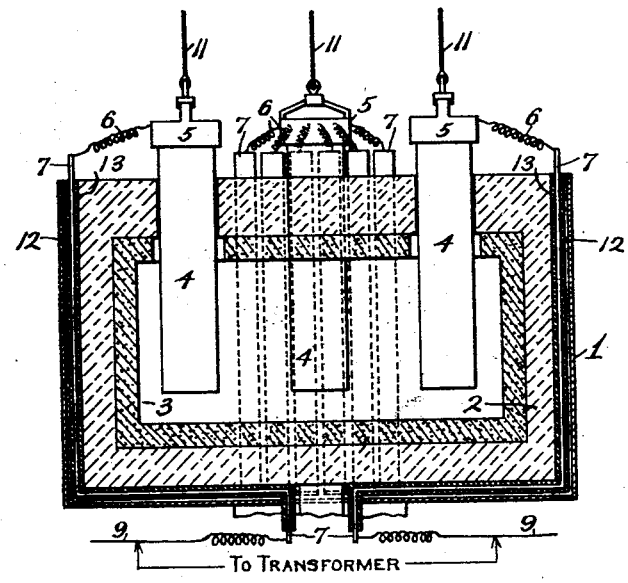
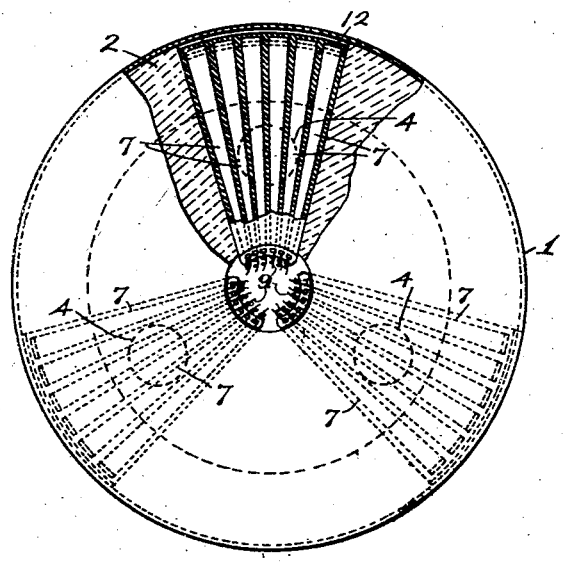

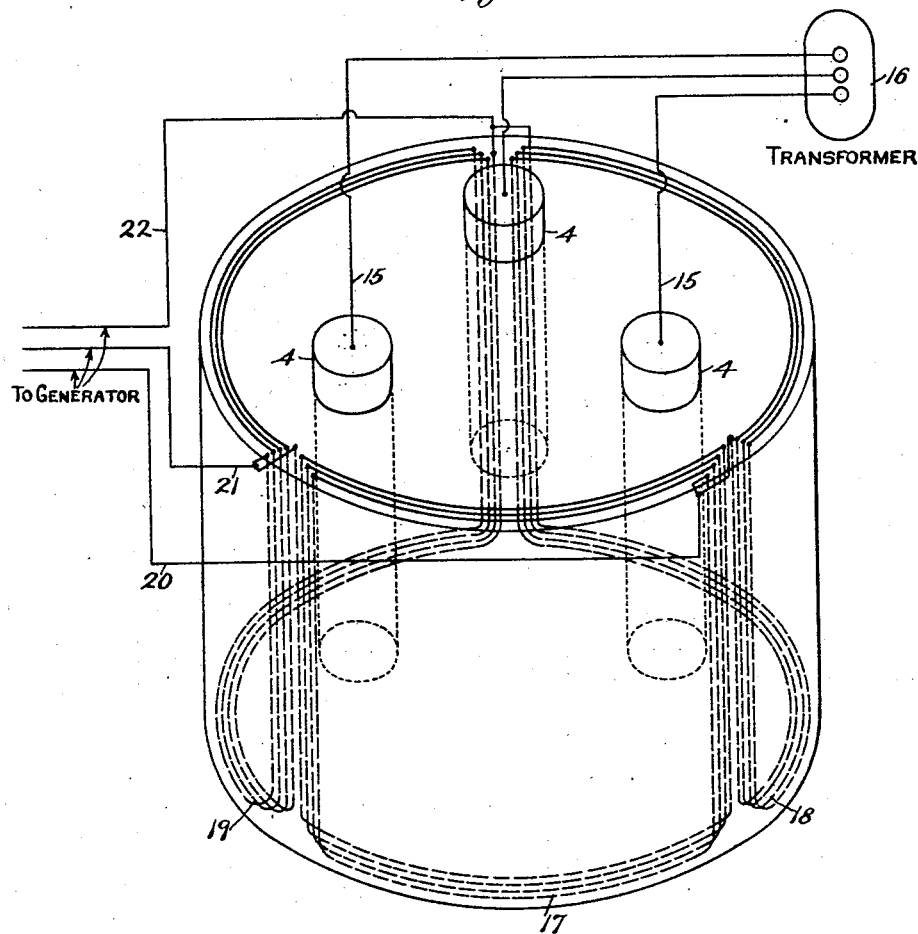

UNITED STATES PATENT OFFICE.

MORRIS H. BENNETT, OF WATERBURY, CONNECTICUT, ASSIGNOR TO SCOVILL MANUFACTURING COMPANY, OF WATERBURY, CONNECTICUT, A CORPORATION OF CONNECTICUT.

ELECTRIC FURNACE.

1,404,734.

Specification of Letters Patent. Patented Jan. 31, 1922.

Application filed October 1, 1919. Serial No. 327,788.

*To all whom it may concern:*

Be it known that I, MORRIS H. BENNETT, a citizen of the United States, residing at Waterbury, county of New Haven, and State of Connecticut, have invented certain new and useful Improvements in Electric Furnaces, fully described and represented in the following specification and the accompanying drawings, forming a part of the same.

This invention relates to improvements in an electric furnace working on polyphase currents, the current being delivered to the charge by electrodes.

In an electric furnace working on a polyphase current which is delivered to the charge by electrodes, there is set up in the area enclosed by the electrodes a rotating magnetic field which may be termed the inner electrode field. The magnetic lines constituting this field are concentrated in the area enclosed by the electrodes, so that a strong field is produced which has a tendency to cause the metal of the charge in the area enclosed by the electrodes to move in the direction of the rotation of the field, and when the metal is molten, will move it.

Due to the current flow in the electrodes, there is also set up in the area surrounding the electrodes, i. e., the area between them and the furnace wall, a rotating magnetic field which may be termed the outer electrode field. The direction of this field is opposite to that of the inner electrode field. The magnetic lines are not, however, concentrated in this area, but they are, on the contrary, divergent. This outer electrode field is, therefore, weak, and, so far as producing any substantial moving effect on the metal is concerned, its effect may be neglected.

The present invention has for its object to produce an improved electric furnace working on a polyphase current which is directly delivered to the charge in the furnace, as by electrodes, the construction being such that there is set up a rotating magnetic field which is additional to the inner and outer rotating magnetic field operating to increase the movement of the metal, thus enabling better mixing and increased heating effects to be obtained.

In the drawings:

Figure 3 illustrates a modified construction embodying the invention;

Figure 4 is an underside plan view of the construction shown in Fig. 3;

Figure 5 is a perspective view of another modified construction of furnace embodying the invention.

Constructions embodying the invention will include in a furnace working on a polyphase heating current which is so delivered to the charge as to set up a rotating magnetic field therein, means for setting up in the charge a rotating magnetic field which is additional to and coacts with the first named field, the effect of such additional field being directed towards increasing the movement of the molten metal and increasing the heating effect.

Figure 1:
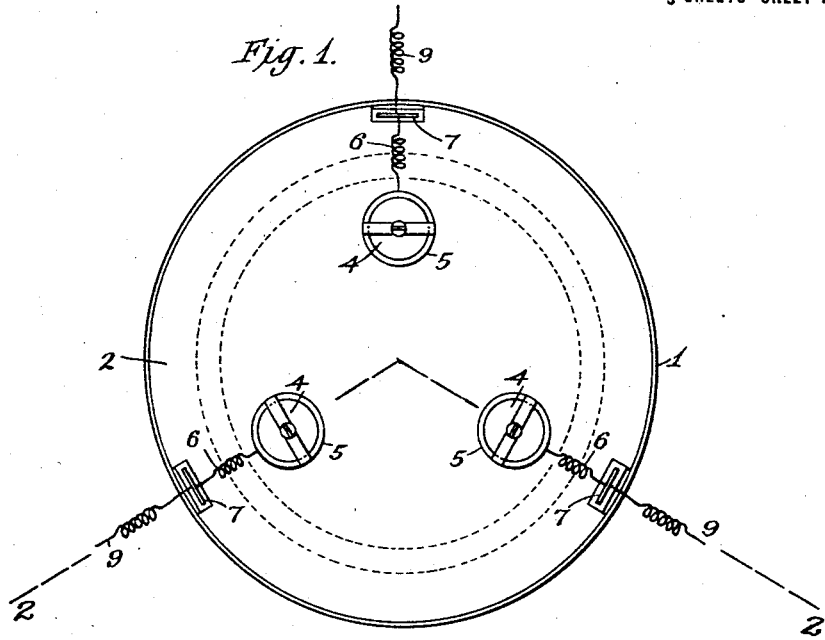
Figure 1 is a plan view of an improved furnace embodying the invention.
Figure 2:
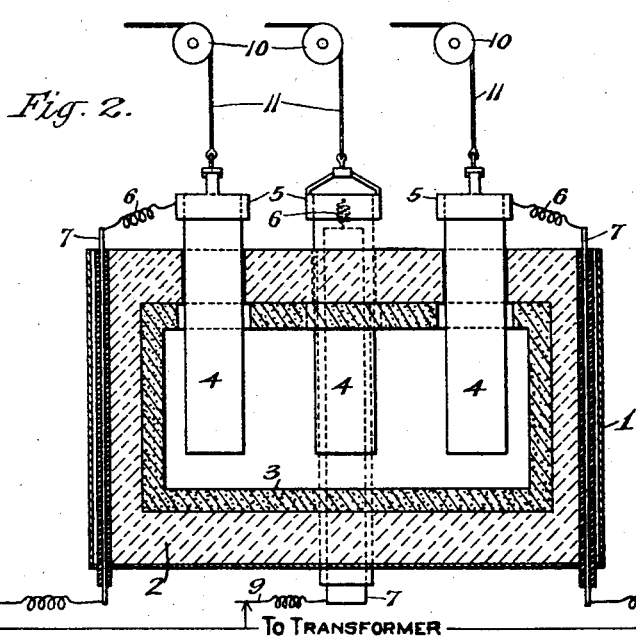
Figure 2 is a section on the line 2—2 of Fig. 1.

Referring to Figs. 1 and 2, 1 indicates the metal shell, 2 the brick lining, 3 the refractory lining. Three electrodes 4 are provided for supplying a three-phase current to the charge in the furnace, these electrodes having terminals 5. Instead, however, of leading directly away from the electrodes, the leads 6 are connected to bus bars 7 which are carried down the sides of the furnace and are supported inside the metal casing. The leads which connect the bus bars to the transformer are indicated at 9. Electrode positioning devices are diagramatically indicated, these comprising cables 10 connected to the electrode terminals and to drums on worm shafts 11, these shafts being operable by worms 12 on hand wheel shafts 13.

With this construction, the polyphase current directly delivered to the charge by the electrodes 4 will set up a concentrated rotating magnetic field in the area lying within the electrodes, which field will tend to rotate the metal in one direction or the other according to the polarity of the current.

The current flowing in the bus bars which run alongside the charge in the furnace, will also set up a rotating magnetic field which is concentrated in the area enclosed by the bus bars. The best effects will be produced where the bus bars are, as shown, parallel with the electrodes and opposite them, in which case, the rotating magnetic field set up by the bus bars will rotate in planes which are parallel to the plane of the surface of the charge. This concentrated rotating bus bar field exercises a strong rotating effect on the metal in the area between the electrodes and the furnace wall. If the polarity of this field be such that its direction is opposite to that of the inner electrode rotating magnetic field, it will cooperate with the outer electrode magnetic field and these two fields will together exercise a rotating effect on the metal. If its direction be opposite to that just described, the rotating magnetic field set up by the bus bars will buck or oppose the outer electrode field, but it will be strong enough to rotate the metal, notwithstanding the opposing effect of this outer field. Of course, the best mixing effect will be obtained where the outer electrode field and the bus bar field have the same direction, as then these fields reenforce each other and the force tending to move the metal is increased.

The bus bar construction just described is also effective in setting up eddy currents in the charge so that an increased heating effect is produced, especially where metals of good conductivity, such as copper, are being melted.

In the construction so far described, the bus bars are shown as running inside the casing. This feature of the construction is important. In most furnace constructions, the exterior wall of the furnace consists of magnetic material, viz., an iron shell. If the bus bars be placed outside of the iron shell, this magnetic material acts as a magnetic shield, and cuts down, to some extent, the effectiveness of the field developed by the current in the bus bars. Of course, if the exterior of the furnace is not constructed of magnetic material, the bus bars may be located on the outside of the furnace. In some cases, furthermore, while the shell of the furnace may consist of magnetic material, it may be so thin, or otherwise of such construction, that the shell will not so seriously impair the field as to make it substantially ineffective. In such cases, the bars may be located on the exterior of the furnace if the loss of efficiency of the field is not regarded as material.

In many cases, it may be desirable to increase the effect of the additional magnetic field as compared with the effect of the field which would be established by a simple bus bar or conductor. To accomplish this, a distributed current carrier may be provided, this carrier, as shown in Figs. 3 and 4, comprising a plurality of bus bars 7 for each electrode, these bus bars being arranged in parallel. This carrier may also be led underneath the charge, as shown in Figs. 3 and 4. When this is done, the conductors forming this carrier may be tapered as they approach the center of the charge, so that each set of bus bars is fanned out underneath the charge. By employing a distributed current carrier, such as has been described, the effect of the additional and coacting magnetic field is increased, thereby increasing both the additional heating and mixing effects. Further, by locating the distributed carrier underneath as well as at the side of the charge, a further magnetic field will be set up. The magnetic field produced by the direct delivery of the current to the charge and the coacting magnetic field set up by the flow of current through the bus bars at the side of the furnace, tend to cause a mixing movement of the metal. The coacting field set up by locating the carrier underneath the charge tends to cause a mixing movement of the metal in a direction which is different from the movement induced by the other field or fields. This still further increases the mixing effect and also the heating effect.

In the construction so far described, the additional coacting fields have been produced by so arranging the flow of the heating current into the electrodes that it will establish a field or fields additional to the fields established by the electrodes, and substantially all the current is utilized in thus producing the field or fields. It is, of course, obvious that only a part of the current may be thus utilized. For instance, a shunt may be employed to send the desired part of the current through the bus bars. Further, the current flow which produces these magnetic fields need not be the flow into the electrodes.

In the construction illustrated in Fig. 5, the terminals 5 of the electrodes are shown as connected with leads 15 which run directly to a transformer, indicated at 16. Conductor coils 17 are, as shown in this construction, located between the shell and the brick work, these conductor coils being directly connected by wires 20, 21, 22 running to a generator. In this construction, as will be readily understood, a coacting field is produced by a current flow which is independent of the flow to the electrode.

As has been indicated, the invention is not to be limited to the specific constructions hereinbefore described. It is to be understood that changes and variations may be made in these constructions and the invention embodied in other constructions so long as the spirit and scope thereof as herein set forth is not departed from.

What is claimed is:

1. In an electric furnace, the combination with means for so delivering polyphase heating current directly to the charge as to set up a rotating magnetic field or fields in the charge, means for setting up current flow in proximity to the charge which establishes a rotating magnetic field in the charge additional to and coacting with the field or fields established by the polyphase heating current.

2. In an electric furnace, the combination with means for so delivering a polyphase heating current directly to the charge as to set up therein a rotating magnetic field or fields, of conductors for carrying polyphase current arranged in such proximity to the charge as to set up therein a rotating magnetic field which is additional to and coacts with the field or fields established by the current delivery directly to the charge.

3. In an electric furnace, the combination with electrodes for so delivering polyphase heating current directly to the charge as to set up a rotating magnetic field or fields in the charge, of conductors for carrying polyphase currents located in such proximity to the charge as to set up therein a rotating magnetic field which is additional to and coacts with the rotating magnetic electrode field or fields.

4. In an electric furnace, the combination with means for so delivering a polyphase heating current to the charge as to set up a rotating magnetic field or fields in the charge, of conductors for carrying polyphase currents arranged at the side of the charge and underneath the charge and in such proximity thereto that these currents set up rotating magnetic fields in the charge, the field due to the flow of the current at the side of the charge coacting with the field or fields established by the heating current delivered to the charge.

5. In an electric furnace, the combination with electrodes for so delivering polyphase heating current as to set up a rotating magnetic field in the charge, of conductors for carrying polyphase currents arranged in such proximity to the charge as to set up a rotating magnetic field or fields therein.

6. The combination, in an electric furnace, with means for delivering a heating current to the charge, of means for setting up a rotating magnetic field or fields underneath the charge, whereby mixing and stirring of the charge at the bottom is secured.

7. In an electric furnace, the combination with means for so delivering a polyphase heating current to the charge as to set up a rotating magnetic field or fields in the charge, of a distributed current carrier for polyphase currents arranged in such proximity to the charge that a rotating magnetic field is set up in the charge which is additional to and coacts with the field or fields established by the heating current.

8. In an electric furnace, the combination with electrodes for so delivering a polyphase heating current to the charge as to set up a rotating magnetic field or fields in the charge, of a distributed current carrier for polyphase currents located at the side of and underneath the charge and in such proximity thereto that the flow of current in that part of the carrier which is alongside the charge sets up a rotating magnetic field or fields in the charge which coacts with the electrode field and other rotating magnetic fields are set up in the charge by the flow of current in that part of the carrier which is underneath the charge.

9. In an electric furnace having three electrodes arranged to deliver a three-phase current to the charge, whereby a rotating magnetic field is set up therein, of conductors carrying polyphase current arranged alongside the charge, said current setting-up a magnetic field or fields which is additional to and coacts with the electrode field.

10. In an electric furnace having three electrodes arranged to deliver a three-phase current to the charge, whereby a rotating magnetic field is set up therein, of conductors carrying a three-phase current located in such proximity to the charge that the current in the conductors sets up rotating magnetic field or fields in the charge which is additional to and coacts with the electrode field.

11. In an electric furnace having three electrodes arranged to deliver a three-phase current to the charge in the furnace whereby a rotating magnetic field is set up therein of conductors carrying a three-phase current arranged alongside of and underneath the charge, the conductors being located in such proximity to the charge that the fields set up by the current flow in that part of the conductors alongside the charge coacts with the electrode field, and the fields set up by the flow of current in that part of the conductors underneath the charge act on the metal in the bottom of the charge.

In testimony whereof, I have hereunto set my hand.

MORRIS H. BENNETT.